Patented June 15, 1937

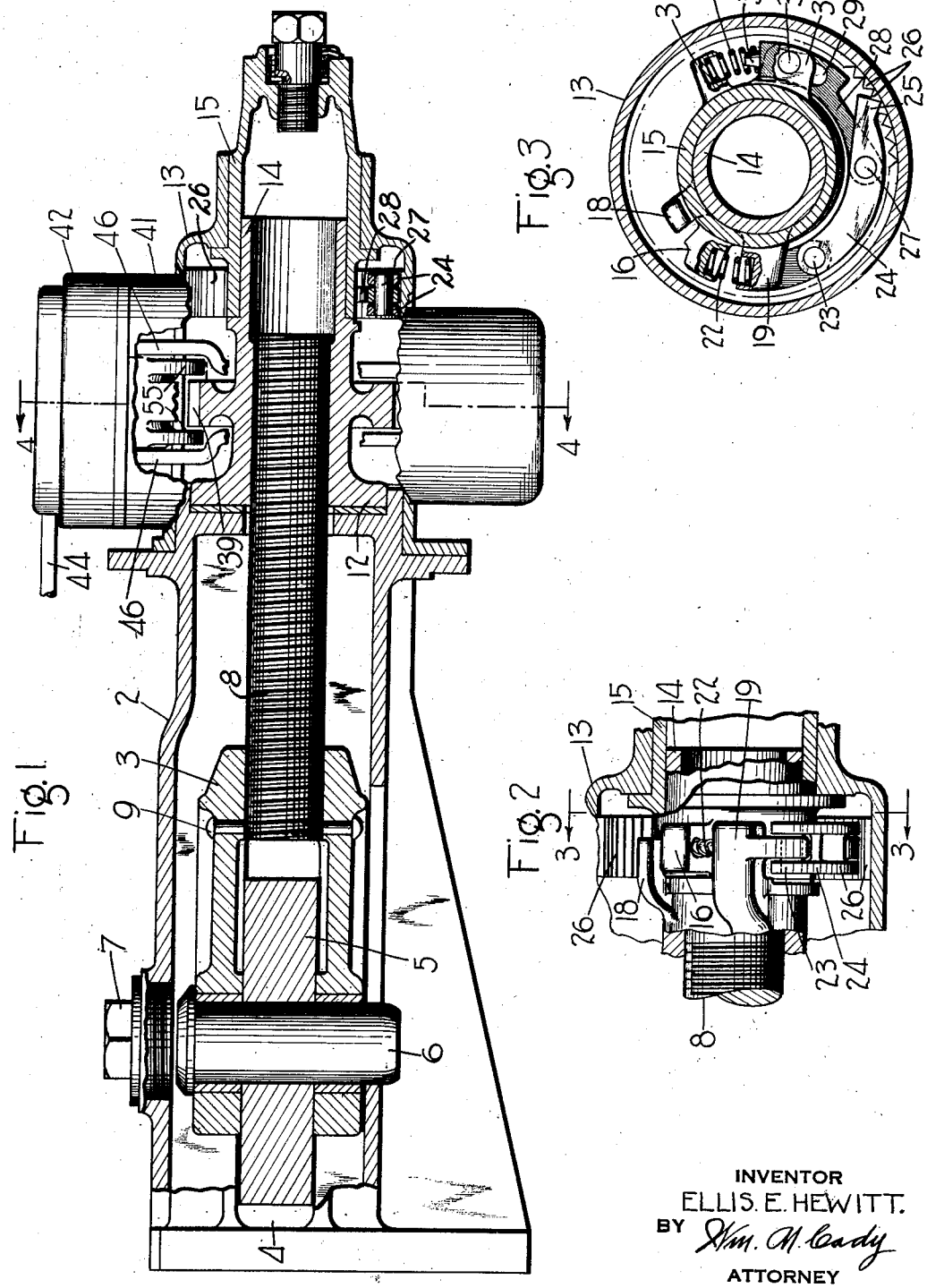

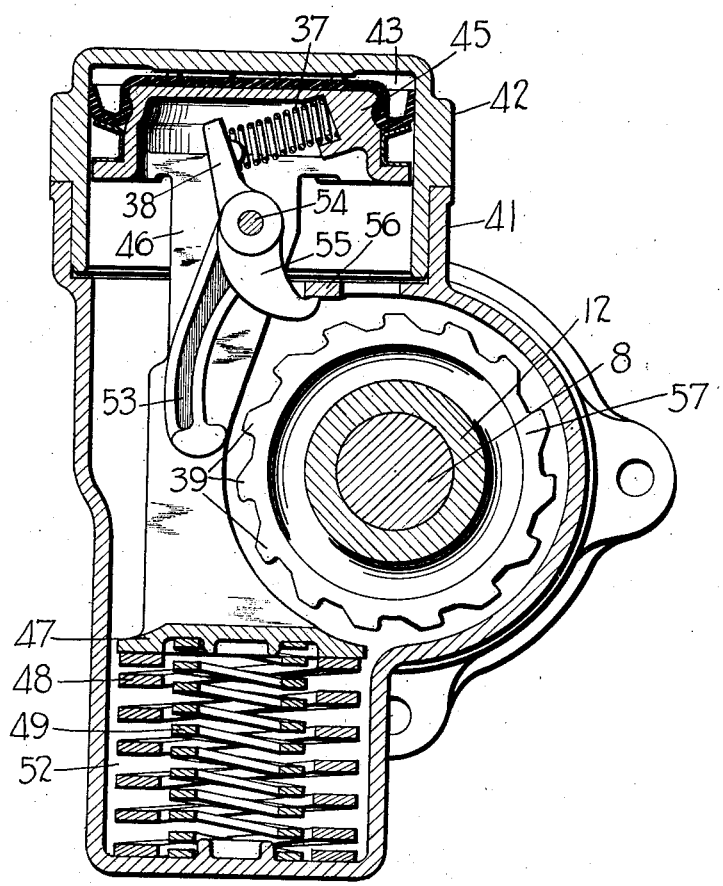

2,083,710

UNITED STATES PATENT OFFICE 2,083,710

AUTOMATIC SLACK ADJUSTER

Ellis E. Hewitt, Edgewood, Pa., assignor to The Westinghouse Air Brake Company, Wilmerding, Pa., a corporation of Pennsylvania Application July 16, 1936, Serial No. 90,862

12 Claims. (Cl. 188—203)

My invention relates to brake equipment for railway vehicles and more particularly to slack adjusting mechanism for vehicles employing fluid pressure brakes.

In many applications of fluid pressure brakes for railway vehicles it is desirable, in order to provide a compact braking unit, to mount the brake cylinders and slack adjusting mechanism directly on the car truck instead of on the car body. Such mounting, however, subjects the parts to a considerable amount of shock caused by the vibration of the truck, and to which they are not subjected when this mechanism is mounted on the car body, since the car body is spring supported from the car truck. Because of the greater amount of vibration to which the slack adjusting mechanism is subjected when mounted on the car truck, there is a greater tendency for the ratchet nut to "back off" between slack adjustments of the mechanism, thus disturbing an adjustment previously made. In installations where slack adjusters are mounted on the car body it has been customary to provide spring-pressed check pawl arrangements for engaging the ratchet wheel which have been satisfactory for such service, but which are not sufficiently positive when the mechanism is subjected to the shock occasioned by mounting on a car truck frame.

This invention is an improvement of the invention described and claimed in the copending application of Frederick G. Williamson, for Automatic slack adjusters, Serial No. 71,460, filed March 28, 1936, and assigned to the same assignee as this application.

It is a general object of my invention to provide a slack adjusting mechanism for fluid pressure brake equipments that is readily adjustable manually and that is sufficiently rugged to prevent changes in the adjustment of the mechanism that might be caused by vibration.

It is a more specific object of my invention to provide a slack adjusting mechanism of the character described having a positive stop or latching mechanism thereon for locking the ratchet nut against backing off from an adjusted position until unlatched by the operator, and that is readily operable manually either to let out slack or to take up slack when desired.

Other objects and advantages of my invention will be apparent from the following description of one preferred embodiment thereof when taken with the accompanying drawings in which Fig. 1 is a view, partly in section, showing slack adjusting mechanism and the supporting bracket therefor, Fig. 2 is a view partly in section and partly in perspective showing the ratchet nut and coupling mechanism, Fig. 3 is a sectional view taken along the lines 3—3 in Fig. 2, and Fig. 4 is a vertical section taken along the lines 4—4 in Fig. 1.

Referring to the drawings, and particularly to Fig. 1 thereof, the slack adjuster body comprises a supporting bracket 1 that is adapted to be mounted on a car truck frame, and provides a casing 2 in which is positioned a cross-head 3. The casing 2 is provided with slots 4 through which a horizontally disposed equalizer lever 5 extends. The equalizer lever 5 is fulcrumed on a pivot pin 6 carried by the cross-head 3 within the slack adjusting mechanism, one end of which is connected to be actuated by the brake cylinder piston and the outer end of which is connected to a suitable pull rod for operating the brake shoes to effect the application or release of the brakes in a well known manner. An opening is provided in the upper wall of the casing 2 for effecting access to the fulcrum pivot pin 6, the opening being normally closed by a cap nut 7.

One end of a screw-threaded shaft 8 is attached to the cross-head 3 by a pin 9 to hold the shaft against rotation, the other end extending through a hole in the casing 2, and being coupled to a ratchet nut 12 mounted within a casing 13 forming an extension of the casing 2. The outer end of the ratchet nut 12 terminates in a sleeve portion 14 positioned within a tubular ratchet nut extension member 15 into which the shaft 8 is adapted to be moved by operation of the ratchet nut 12 to move the cross-head 3 and the fulcrum pin 6 toward the right to take up slack in the brake mechanism.

As shown in Figs. 2 and 3, a lug 16 that is integral with the sleeve 14 is positioned between lugs 18 and 19 that are integral with the ratchet nut extension member 15, the lug 16 being urged from lug 19 by a spring 22, one end of which interfits in a recess in the lug 16 and the other end of which interfits in a recess in the lug 19. The lug 19 is connected by a pin 23 to one end of a latch member 24, the other end of which is provided with a squared end 25 that is adapted to engage teeth 26 on the wall of the casing 13. A point intermediate the ends of the latch member 24 is connected by a pin 27 to one end of a link member 28, the other end having a slot 29 therein through which extends a pin 32 that is carried by a pair of lugs 33 that extend outwardly from the ratchet nut extension member 15 on the side opposite the lug 16. A lug 34 extends outwardly from the member 15 and is spaced from the lug 33 to accommodate a spring 35, one end of which is positioned in a recess in the lug 34 and the other end of which fits over a knob 36 on the end of the link 28.

Arranged transversely of the casing 2 is a casing 41 (see Figs. 1 and 4) having a cylinder 42 at one end thereof providing a piston chamber 43 that is connected by means of an adjuster pipe 44 to the slack adjuster port of a brake cylinder (not shown), in a well known manner, to supply fluid under pressure to the piston chamber 43 when the travel of the brake cylinder piston, during a braking application, is sufficient to uncover the slack adjuster port.

A piston 45 is contained within the piston chamber 43 from which extends a piston stem 46 that may be in the form of parallel arms or brackets, to the outer end of which is connected a plate 47 that is adapted to be engaged by one end of a pair of concentric springs 48 and 49 that are contained in a chamber 52 in the other end of the casing 41, for normally urging the piston 45 to its upper or illustrated position. A pawl 53 is pivotally connected to the stem 46 by means of a pin 54, and is provided with a lug 55 that is adapted to engage a stop member 56 when the piston is in its upper or illustrated position, to force the pawl 53 in a clockwise direction about the pin 54 against the force of a spring 37, one end of which engages a lever portion 38 of the pawl 53 and the other end of which interfits in a recess in the piston 45.

Upon application of the brakes, if the travel of the brake cylinder piston exceeds the normal amount desired, the piston will uncover the slack adjuster port in the brake cylinder wall so that fluid under pressure will be supplied through the pipe 44 to the piston chamber 43 of the slack adjuster cylinder and the piston 45 will be moved downwardly, the lug 55 disengaging the stop 56 and permitting the pawl 53 to be forced in a counter-clockwise direction by the spring 37 so that the pawl engages between teeth 39 of a ratchet wheel 57 formed integral with the ratchet nut 12. Upon the release of fluid under pressure from the brake cylinder and from the piston chamber 43, the pawl 53 and piston 45 will be moved upwardly by the springs 48 and 49, thus moving the ratchet wheel 57 in a clockwise direction, as viewed in Fig. 4, to move the shaft 8 slightly toward the right, as viewed in Fig. 1.

During this clockwise movement of the ratchet wheel 57, the latch and coupling mechanism illustrated in Figs. 2 and 3 will be correspondingly actuated, the lug 19 which is integral with the sleeve portion 14 of the ratchet nut 12 being moved toward the lug 16 against the force of the spring 22 sufficiently to permit the end 25 of the latch 24 to ride over the top of the teeth 26 to a new position. At the conclusion of this movement, however, the spring 22 forces the lug 16, and the ratchet nut extension member 15 that is integral therewith, in a clockwise direction with respect to the lug 19, the lug 34 thus compressing the spring 35 and bringing pressure on the end of the link member 28, causing it to force the end 25 of the latch 24 outwardly against the wall of the casing 13 to engage one of the teeth 26, so that a counter-clockwise movement of the sleeve 14, corresponding to a "backing off" action of the ratchet nut, is prevented. It will be noted that when the member 15 is moved in a clockwise direction to bring pressure on the spring 35, the pin 32 attached to the lugs 33 slides in the slot 29 provided in the link member 28, thus providing a flexible coupling between the member 15 and the latch 24 and preventing the latch member 24 from being forced so tightly against the teeth 26 as not to ride readily over the top thereof upon movement of the member 15 in a clockwise direction.

When it is desired to take up the slack manually the ratchet nut extension member 15 may be moved in a clockwise direction as viewed in Fig. 3, the lug 16 thereon engaging the lug 18 and causing the latch to be raised from engagement with the teeth 26 in the same manner as when the ratchet nut 12 and the sleeve 14 are moved by the pawl 53 and the ratchet wheel 57.

If it is desired to back off the ratchet nut 12 to let out slack, the ratchet nut extension member 15 may be moved manually in a counter-clockwise direction as viewed in Fig. 3, the link member 28 being moved by the pin 32 in the lug 33 which engages the end of the slot 29, thus raising the latch member 24 so that the end 25 thereof is drawn away from engagement with the teeth 26, thus permitting the member 15 and the ratchet nut 12 to be moved in a counter-clockwise direction as viewed in Fig. 3, which is the reverse of the direction of motion caused by the pawl 53 of the slack adjuster mechanism. The member 15 is coupled to the ratchet nut 12 through lug 33, pin 32, link 28, latch 24, pin 23 and lug 19 that is integral with the ratchet nut sleeve 14.

It will be noted, therefore, that when force is applied to the coupling mechanism illustrated in Fig. 3 tending to move the mechanism in a counter-clockwise direction, if it is applied to the lug 19 that is integral with the ratchet nut sleeve 14, the latch 24 is forced tightly into engagement with the teeth 26, thus preventing the lug 19 and the ratchet nut 12 from turning, while, if this force is applied through the lugs 18 and 33 that are integral with the sleeve 14, the latch 24 is raised from engagement with the teeth 26, thus permitting the ratchet nut to be moved.

It will be obvious to one skilled in the art that many modifications may be made within the spirit of my invention and I do not wish to be limited otherwise than by the scope of the appended claims.

Having now described my invention, what I claim as new and desire to secure by Letters Patent, is:

1. In a brake slack adjuster, the combination with a ratchet wheel and pawl, and means operated thereby for taking up the slack, of a piston subject on one side to fluid under pressure for operating said pawl, a spring opposing the fluid pressure on the piston, latching means for preventing accidental reverse movement of the ratchet wheel, a manually operable means coupled to the said ratchet wheel for releasing the latching means to permit movement of the ratchet wheel in a direction to let out slack, and separate coupling means operative after a predetermined movement of said manually operable means in the opposite direction for releasing the latching means to permit movement of the ratchet wheel in a direction to take up slack.

2. In a brake slack adjuster, the combination with a casing, a ratchet wheel and pawl disposed within the casing, and means operated thereby for taking up the slack, of automatic means for actuating the pawl and ratchet wheel, a latch carried by said ratchet wheel member for latching the ratchet wheel to said casing to prevent accidental reverse movement thereof, a manually movable member, coupling means comprising cooperating lugs on said ratchet wheel member and said manually movable member adapted to be actuated into engagement upon movement of said manually movable member in one direction for actuating said ratchet wheel in a direction to take up slack.

3. In a brake slack adjuster, the combination with a casing, a ratchet wheel and pawl disposed within the casing, and means operated thereby for taking up the slack, of automatic means for actuating said pawl and ratchet wheel, a latch carried by the ratchet wheel member for latching the ratchet wheel to said casing to prevent accidental reverse movement thereof, a manually movable member, coupling means comprising cooperating lugs on said ratchet wheel member and said manually movable member adapted to engage upon movement of said manually movable member in one direction for actuating said ratchet wheel in a direction to take up slack, and coupling means comprising said latch, a link connected thereto, and means responsive to movement of said manually operable means in a reverse direction for actuating said latch from engagement with said casing and for actuating said ratchet wheel in a direction to let out slack.

4. In a brake slack adjuster, the combination with a casing, a ratchet wheel and pawl disposed within the casing, and means operated thereby for taking up slack, of automatic means for actuating said pawl and ratchet wheel, a latch carried by said ratchet wheel and adapted to engage teeth provided on the wall of the casing, coupling means comprising said latch, and a slotted link connected thereto, resilient means for biasing said link to force said latch against said teeth, and means integral with said manually movable means extending within the slot in said latch and adapted, upon movement of said manually operable means in one direction, to lift said latch from engagement with said teeth and to actuate said latch and ratchet wheel in a direction to let out slack.

5. In a brake slack adjuster, the combination with a casing, a ratchet wheel and pawl disposed within the casing, and means operated thereby for taking up slack, of automatic means for actuating said pawl and ratchet wheel, a latch carried by said ratchet wheel member and adapted to engage teeth provided on the wall of the casing, coupling means comprising said latch and a slotted link connected thereto, resilient means for biasing said link to force said latch against said teeth, and means integral with said manually operable means extending within the slot in said latch to form a loose coupling and adapted, upon movement of said manually operable means in one direction, to lift said latch from engagement with said teeth and actuate said latch and ratchet wheel in a direction to let out slack, and coupling means comprising cooperating lugs on said ratchet wheel member and on said manually movable member, operable upon movement of said manually movable member in the other direction for actuating said ratchet wheel in a direction to take up slack.

6. In an automatic slack adjuster for fluid pressure brakes, in combination, a casing, a ratchet wheel disposed within said casing, and means operated by the wheel for taking up the slack, a piston and pawl in the casing for operating the ratchet wheel, means for preventing a reverse movement of said ratchet wheel comprising an extension member mounted for rotation about the axis of said ratchet wheel, a latch member pivotally connected at one end to move with said ratchet wheel and adapted at the other end to engage teeth provided on the wall of the casing, a link connected at one end to a point intermediate the ends of the latch member and provided at the other end with a slot through which extends a pivot supported from the extension member to provide a loose coupling, and biasing means for urging said link and latch toward each other to force the engaging end of the latch outwardly against said casing.

7. In a brake slack adjuster, the combination with a ratchet nut, automatic means for operating said ratchet nut, and means operated thereby for taking up the slack, of a sleeve extension member axially alined with the ratchet nut and adapted to rotate therewith, latching means for locking said nut against reverse movement comprising a latch member carried by said ratchet nut and extending about said sleeve extension member and adapted to engage teeth provided in the wall of the casing, and a link pivotally secured at one end to the said latch member and provided with a slot at the other end, a pin carried by said sleeve member and positioned in said slot to provide a loose coupling, biasing means for urging said link toward said latch, and biasing means for urging said latch toward said link to force said latch into engagement with said teeth, and means for decreasing the force of the one or the other of the said biasing means upon movement of said sleeve in either direction to release said latch.

8. In a brake slack adjuster, the combination with a ratchet nut, automatic means for operating said ratchet nut, and means operated thereby for taking up the slack, of a sleeve extension member axially alined with said ratchet nut and adapted to rotate therewith, latching means for locking said nut against reverse movement comprising a latch member carried by said ratchet nut and extending about said sleeve extension member and adapted to engage teeth provided in the wall of the casing, and a link pivotally secured at one end to said latch member and provided with a slot at the other end, a pin carried by said sleeve member positioned in said slot to provide a loose coupling, a lug on said sleeve and biasing means between said lug and said latch member for biasing said latch toward said link, a second lug on said sleeve and biasing means between said lug and said link for biasing said link toward said latch, said two biasing means jointly effecting engagement of the latch member with said teeth.

9. In a brake slack adjuster, the combination with a ratchet nut, automatic means for operating said ratchet nut, and means operated thereby for taking up the slack, of a sleeve extension member axially alined with said ratchet nut and adapted to rotate therewith, latching means for locking said nut against reverse movement comprising a latch member carried by said ratchet nut and extending about said sleeve extension member and adapted to engage teeth provided in a wall of the casing, and a link pivotally secured at one end to said latch member and provided with a slot at the other end, a lug on said sleeve and biasing means between said lug and said latch for biasing said latch toward said link, a second lug on said sleeve and biasing means between said lug and said link for biasing said link toward said latch, said two biasing means jointly effecting engagement of said latch with said teeth, means for releasing one of said biasing means and for positively actuating said latch from engagement with said teeth upon movement of said sleeve in one direction, and means for releasing the other of said biasing means and for positively actuating said latch from engagement with said teeth upon movement of said sleeve in the other direction.

10. In a brake slack adjuster, the combination with a ratchet wheel and pawl, and means operated thereby for taking up the slack, of a piston subject on one side to fluid under pressure for operating said pawl, a spring opposing the fluid pressure on the piston, latching means for preventing accidental reverse movement of the ratchet wheel, manually operable means movable in one direction for releasing said latching means, and means for permitting movement of said manually operable means in the opposite direction relative to said latching means.

11. In a brake slack adjuster, the combination with a ratchet wheel and pawl, and means operated thereby for taking up the slack, of a piston subject on one side to fluid under pressure for operating said pawl, a spring opposing the fluid pressure on the piston, latching means for preventing accidental reverse movement of the ratchet wheel including a pawl, a manually rotatable member operatively connected to said pawl, a link operatively connected to said pawl, a pin carried by said member for operating said link and thereby said pawl upon movement of said member in one direction, and means for permitting movement of said member in the opposite direction relative to said link and pawl.

12. In a brake slack adjuster, the combination with a ratchet wheel and pawl, and means operated thereby for taking up the slack, of a piston subject on one side to fluid under pressure for operating said pawl, a spring opposing the fluid pressure on the piston, latching means for preventing accidental reverse movement of the ratchet wheel including a pawl, a manually rotatable member operatively connected to said pawl, a link operatively connected to said pawl having a longitudinal slot therein, a pin carried by said manually rotatable member and adapted to engage within one end of said slot for operating said link and thereby said pawl upon movement of said member in one direction, said slot and pin connection permitting movement of said member in the opposite direction relative to said link and pawl, and means for biasing said member relative to said link to urge said pin toward the above designated engaging end of said slot.

ELLIS E. HEWITT.